(12) United States Patent
Holtz et al.

(10) Patent No.: US 7,644,952 B2
(45) Date of Patent: Jan. 12, 2010

(54) SEAT BELT RESTRAINT SYSTEM

(75) Inventors: Kimberlee D. Holtz, Royal Oak, MI (US); Thomas E. Drobot, Clarkston, MI (US)

(73) Assignee: Chrysler Group. LLC, Auburn Hills, MI (US)

( * ) Notice: Subject to any disclaimer, the term of this patent is extended or adjusted under 35 U.S.C. 154(b) by 453 days.

(21) Appl. No.: 11/530,577

(22) Filed: Sep. 11, 2006

(65) Prior Publication Data

US 2008/0061545 A1   Mar. 13, 2008

(51) Int. Cl.
*B60R 22/00* (2006.01)
*B60R 22/36* (2006.01)

(52) U.S. Cl. .............. 280/801.1; 280/806; 297/479; 297/480

(58) Field of Classification Search ............. 280/801.1, 280/806, 807, 808; 297/468, 470, 479, 480, 297/483
See application file for complete search history.

(56) References Cited

U.S. PATENT DOCUMENTS

| | | | |
|---|---|---|---|
| 3,860,261 A | 1/1975 | Takada | |
| 3,923,321 A | 12/1975 | Andreas et al. | |
| 3,950,826 A | 4/1976 | Knoll et al. | |
| 4,023,427 A | 5/1977 | Beier | |
| 4,747,617 A | 5/1988 | Magyar et al. | |
| 5,015,010 A | 5/1991 | Homeier et al. | |
| 5,294,150 A | 3/1994 | Steffens, Jr. | |
| 5,340,198 A | 8/1994 | Murphy et al. | |
| 5,358,310 A | 10/1994 | Nemoto | |
| 5,390,977 A | 2/1995 | Miller | |
| 5,615,917 A | 4/1997 | Bauer | |
| 5,704,638 A * | 1/1998 | Lane, Jr. | 280/730.2 |
| 5,716,102 A | 2/1998 | Ray et al. | |
| 6,036,274 A * | 3/2000 | Kohlndorfer et al. | 297/480 |
| 6,145,881 A | 11/2000 | Miller, III et al. | |
| 6,264,280 B1 | 7/2001 | Ohlund | |
| 6,340,176 B1 * | 1/2002 | Webber et al. | 280/806 |
| 6,406,059 B1 * | 6/2002 | Taubenberger et al. | 280/733 |
| 6,419,271 B1 * | 7/2002 | Yamada et al. | 280/806 |
| 6,447,011 B1 * | 9/2002 | Vollimer | 280/806 |
| 6,527,298 B2 | 3/2003 | Kopetzky | |
| 6,533,315 B2 * | 3/2003 | Brown et al. | 280/733 |
| 6,866,296 B2 * | 3/2005 | Webber et al. | 280/806 |
| 7,188,868 B2 * | 3/2007 | Yamaguchi | 280/806 |
| 7,350,734 B2 * | 4/2008 | Stevens | 242/374 |
| 7,469,766 B2 * | 12/2008 | Guo et al. | 180/268 |
| 2004/0113411 A1 | 6/2004 | Djien | |

* cited by examiner

*Primary Examiner*—Toan C To
(74) *Attorney, Agent, or Firm*—Ralph E. Smith

(57) ABSTRACT

A seat belt is secured to an anchor at one side of a seated person and extends across the seated person's body to a second anchor at an opposite side of the seated person to which the belt is also secured. A belt retention device is operable, when actuated in response to a sudden, rapid deceleration of the vehicle, to grip the belt between the anchors at a point of engagement adjacent to the one side of the seated person to cooperate with the second anchor in taking up any slack in a section of the belt between the point of engagement and the second anchor and also maintaining such section of the belt tightly engaged across the person's body.

16 Claims, 3 Drawing Sheets

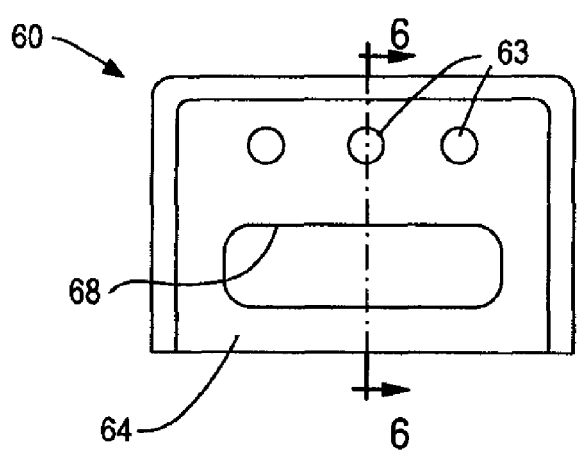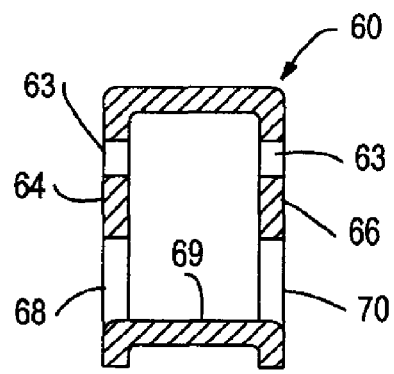
FIG. 5  FIG. 6
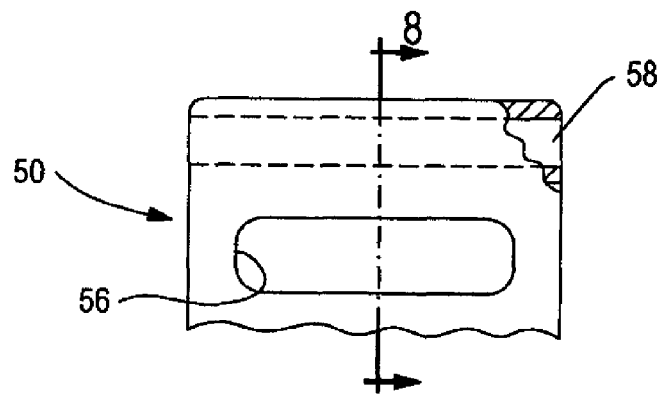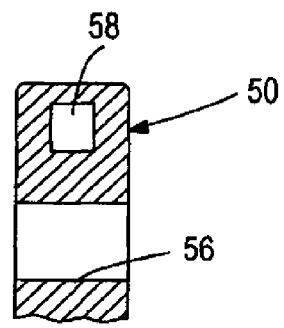
FIG. 7  FIG. 8

SEAT BELT RESTRAINT SYSTEM

FIELD OF THE INVENTION

The present invention relates generally to vehicle safety systems and more particularly to a vehicle seat belt restraint system.

BACKGROUND OF THE INVENTION

Seat belt restraint systems have been developed over many years and now include retention devices operable, when actuated in response to a sudden, rapid deceleration of the vehicle, usually a frontal crash, to take up slack in the seat belt and maintain the seat belt tightly engaged with a seated person. Such retention devices have been incorporated into a retractor at one end of the seat belt or into a buckle at the opposite end of the seat belt. However, due to the overall length of a seat belt from the retractor to the buckle, and the existence of slack throughout that length, it takes too much time after triggering of the retention device to take up all of the slack. This holds true even though only a fraction of a second is required to actuate the retention device. When a frontal crash occurs, the seated person is not completely prevented from shifting until all of the slack is eliminated.

SUMMARY OF THE INVENTION

In accordance with the present invention, the slack in a limited section of the seat belt, that is, the section extending across the body of the seated person, is taken up when the retention device is actuated. As a result, the seated person is securely restrained within a shorter period of time after the retention device is triggered.

Further in accordance with the invention, a belt retention device is provided between the ends of the seat belt at an intermediate location close to one side of a seated person. When actuated in response to a sudden rapid deceleration of the vehicle, the retention device grips the seat belt and cooperates with a seat belt anchor at the other side of the person in taking up slack in a limited section of the belt between the retention device and the anchor and also in maintaining that limited section of the belt tightly engaged across the person's body.

Preferably, the seat belt extends from a first anchor through a turning loop and from the turning loop across the seated person's body to a second anchor. The belt retention device is operable to grip the belt at a point of engagement adjacent one side of the seated person to cooperate with the second anchor in taking up any slack in the section of the belt between the point of engagement and the second anchor and also in maintaining such section of the belt tightly engaged across the person's body.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein:

FIG. 5 is an elevational view of a cincher which is one part of the retention device;

FIG. 6 is a sectional view taken on the line 6-6 in FIG. 5;

FIG. 7 is a fragmentary elevational view of a puller which is another part of the retention device; and FIG. 8 is a sectional view taken on the line 8-8 in FIG. 7.

DETAILED DESCRIPTION OF THE PREFERRED EMBODIMENT

The following description of the preferred embodiment is merely exemplary in nature and is in no way intended to limit the invention, its application, or uses.

Figure 1:
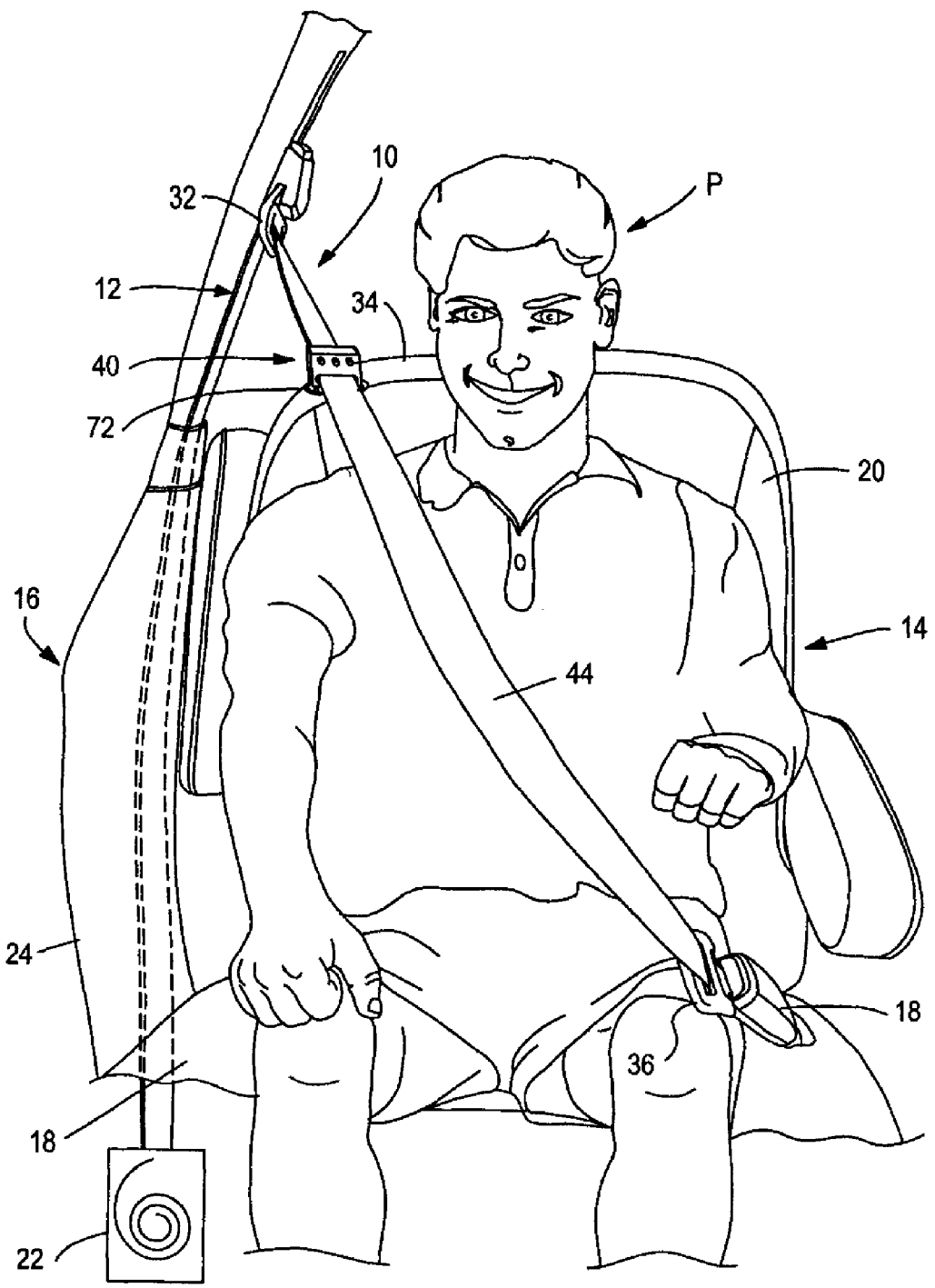
FIG. 1 is an elevational view showing a person belted in a seat of an automotive vehicle by a seat belt restraint system including a retention device, constructed in accordance with the present invention.
Figure 2:
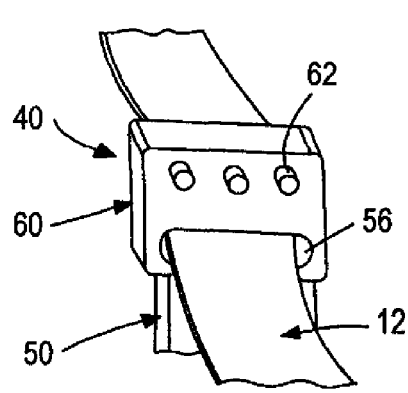
FIG. 2 is an enlarged fragmentary perspective view of the retention device.
Figure 4:
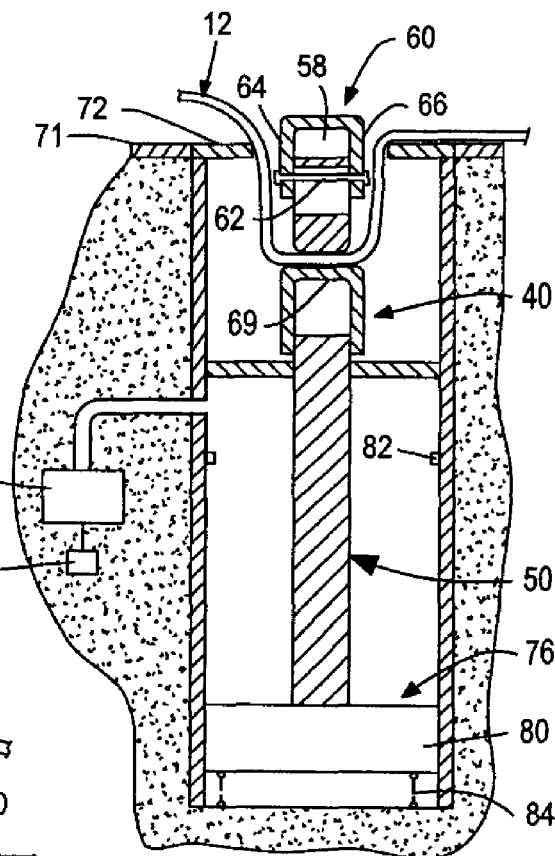
FIG. 4 is a view similar to FIG. 3, but shows the parts in a different position.
Figure 3:
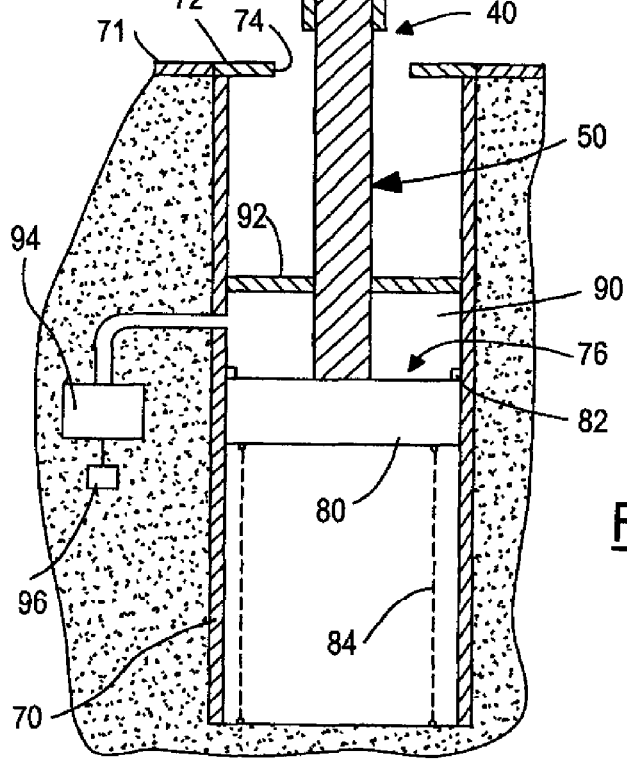
FIG. 3 is a sectional view showing the retention device, and also showing the operating mechanism for the retention device.

Referring now more particularly to the drawings, and especially to FIG. 1, there is illustrated a seat belt restraint system 10 which includes a shoulder seat belt 12 extending across the body of a person P seated in an automotive vehicle seat 14. A lap belt is usually also provided but is not shown. The seat 14 is firmly mounted to the floor of a vehicle body 16 of the usual construction including side and pillar sections. The seat 14 includes a seat portion 18 and a back 20 which extends upwardly to about shoulder level of an adult person occupying the seat.

A seat belt anchor in the form of a retractor 22 is mounted at the outer side of the seat 14 adjacent to the vehicle side wall 24. The retractor 22 may be of known construction in which a reel is spring loaded to normally rewind the seat belt 12 and automatically lock the seat belt against further withdrawal when withdrawn a desired amount.

Mounted to the vehicle body in any suitable manner, either to the side wall 24 or to a vehicle body pillar, is a belt guide which is shown as being in the form of a D-shaped turning loop 32. The turning loop 32 is located vertically above the retractor 22 and above the level of the outer side shoulder portion 34 of the seat back 20. The seat belt 12 extends from the retractor 22 upon which it is partially wound, upwardly through the turning loop 32 and from the turning loop diagonally downwardly from the shoulder of the seated person across the seated person's body from the outer side to the inner side of the seated person. The seat belt 12 terminates in a buckle 36 which is releasably secured to an anchor 38 mounted on the vehicle at the inner side of the person.

A belt retention device 40 is provided and is operable, when actuated in response to a sudden, rapid deceleration of the vehicle (such as a frontal collision) to grip the belt 12 at a point of engagement adjacent to the outer shoulder of the seated person to cooperate with the anchor 38 in taking up any slack in the belt but primarily in a limited section 44 of the belt between the point of engagement and the anchor 38 and also in maintaining such limited belt section 44 tightly engaged across the person's body.

Referring now to FIGS. 2-8, the seat belt retention device 40 includes a puller 50 which is preferably in the form of a flat vertical bar of rectangular cross section. The puller 50 has an oval-shaped opening 56 spaced beneath its top that extends through the puller from front to rear. Between the top of the puller 50 and the opening 56, the puller 50 has a transverse horizontal passage 58 that extends through the puller from side to side.

The retention device 40 also includes a cap-like cincher 60 which is rectangular in cross section, closed at the top and open at the bottom so that it closely and slidably fits over the upper end of the puller 50. The cincher 60 is secured to the puller 50 by pins 62 which extend through holes 63 in the front and rear walls 64 and 66 of the cincher and through the transverse passage 58 in the puller, enabling the cincher to move up and down on the puller 50 a distance determined by the vertical extent of the passage. The cincher 60 also has matching openings 68 and 70 in its front and rear walls 64 and 66 which have the same shape as the opening 56 in the puller 50 and overlap the opening 56. The openings 68 and 70 are in alignment with the opening 56 when the cincher 60 is in its normal position shown in FIG. 3. The lower edges of the openings 68 and 70 are connected by a bridge 69. The seat belt passes freely through the openings 56, 68 and 70 in this position of the puller and cincher shown in FIG. 3.

The puller 50 extends upwardly from within a vertical cylinder 70 anchored in the outer shoulder portion 34 of the seat back 20. The upper end of the cylinder 70 is substantially flush with the fabric or leather cover material 71 at the top of the seat back 20 and is partially closed by an annular cover plate 72 which has an inner edge 74 that surrounds and clears the puller 50. An operating mechanism 76 is provided to pull the puller 50 down, including a piston 80 reciprocable in the cylinder 70. The puller 50 is secured to the piston 80. The piston is normally pressed upwardly against a stop ring 82 by a compression spring 84 in the bottom of the cylinder to a position in which the puller 50 projects out of the cylinder and above the seat back as shown in FIG. 1. This is the normal or passive position of the retention device 40 in which the openings 56, 68 and 70 in the puller 50 and the cincher 60 are in substantial alignment and hence the retention device 40 does not grip or interfere with the extension or retraction of the seat belt.

A cylinder chamber 90 is defined between the piston 80 and a partition 92 above the piston through which the puller 50 extends. In the event of a frontal impact or collision of the vehicle, expanding gas from an actuator, which is shown as being in the form of a pyrotechnic device 94, enters the chamber 90 to force the piston 80 downward against the force of the compression of spring 84 to the FIG. 4 position, drawing the puller 50 with it. The pyrotechnic device 94 is actuated by a trigger 96 which may be an inertial sensor or accelerometer or other device for sensing a sudden vehicle impact. In the FIG. 4 position, the puller 50 draws the seat belt 12 down into the cylinder 70 to take the slack out of the entire seat belt, particularly the section 44 of the seat belt extending across the body of the seated person. The openings 68 and 70 in the cincher 60 move slightly out of alignment with the opening 56 in the puller 50 and hence the seat belt is gripped or cinched between the upper edge of the opening 56 in the puller 50 and the bridge 69 in the cincher 60. The cincher 60 is held up slightly in FIG. 4 by the resistance of the belt to being pulled down.

The retention device 40 comprising the puller 50 and cincher 60 may is also be considered as a pretensioner because not only does it take out any slack that exists in the seat belt, particularly the limited section 44 of the seat belt 12 between the retention device and the anchor 36, but it also pretensions that section of the seat belt.

It will be noted that in the event of a sudden deceleration of the vehicle, the belt retention device 40 of this invention pretensions and takes up the slack in that section 44 of the seat belt 12 which extends across the body of the seated person. As a result, the seated person is securely restrained within a much shorter period of time than is the case with devices which the pretensioner is in one end of the seat belt or the other.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat belt restraint system for a person seated in a seat of a vehicle comprising:
   a first anchor,
   a seat belt having a first portion secured to the first anchor, said seat belt extending from one side of the seated person across the seated person's body to a second anchor at an opposite side of the seated person to which a second portion of the belt is secured,
   a belt retention device operable, when actuated in response to a sudden, rapid deceleration of the vehicle, to grip the belt between said anchors at a point of engagement adjacent to said one side of the seated person to cooperate with the second anchor in taking up any slack in a section of the belt between the point of engagement and the second anchor and also maintaining such section of the belt tightly engaged across the person's body;
   an operating mechanism for actuating the belt retention device that moves said belt retention device from a passive, non-belt gripping position to a position gripping the belt;
   wherein said retention device comprises a puller, and a cincher cooperable with said puller in the gripping of the belt;
   wherein said cincher is mounted on said puller for movement relative to said puller between the non-belt gripping position and the position gripping the belt; and
   wherein said puller and said cincher have overlapping openings through which the belt passes, in the non-belt gripping position of the retention device the overlapping openings are in substantial alignment, in the position grinning the belt the openings are slightly out of alignment to grip the belt.

2. The seat belt restraint system of claim 1, wherein said retention device securely cinches the belt when actuated.

3. The seat belt restraint system of claim 1, wherein said retention device comprises a pretensioner to pretension the belt at said point of engagement when said retention device is actuated.

4. The seat belt restraint system of claim 3, wherein said retention device securely cinches the belt when actuated.

5. The seat belt restraint system of claim 1, wherein the seat belt comprises a diagonally extending shoulder belt.

6. The seat belt restraint system of claim 1, wherein said puller has a transverse passage and said cincher comprises front and rear walls and is secured to said puller by a plurality of spaced apart pins that extend through holes in said front and rear walls of said cincher and through said transverse passage in said puller.

7. The seat belt restraint system of claim 1, wherein said puller is carried by a back of the vehicle seat.

8. The seat belt restraint system of claim 7, wherein said puller comprises a piston and cylinder arrangement.

9. The seat belt restraint system of claim 1, further comprising a D-shaped turning loop and wherein said seat belt extends from said first anchor through said D-shape turning loop.

10. A seat belt restraint system for a person seated in a seat of a vehicle, comprising:

a first anchor, a seat belt having a first portion secured to the first anchor, said seat belt extending from said first anchor through a turning loop, said seat belt extending from the turning loop across the seated person's body from one side to the other side of the seated person and terminating in a second portion secured to a second anchor at said other side of the seated person, a belt retention device operable, when actuated in response to a sudden, rapid deceleration of the vehicle, to grip the belt between said turning loop and said second anchor at a point of engagement adjacent to said one side of the seated person to cooperate with the second anchor in taking up any slack in a section of the belt between the point of engagement and the second anchor and also maintaining such section of the belt tightly engaged across the person's body and wherein said retention device comprises a pretensioner that pretensions the belt, a puller, and a cincher cooperable with said puller in gripping the belt;

an operating mechanism that actuates said belt retention device causing said belt retention device to be moved from a passive, non-belt gripping position to a belt-gripping position;

wherein said cincher is mounted on said puller and movable relative to said puller between the non-belt gripping position and the belt-gripping position; and wherein said puller and said cincher have overlapping openings through which the belt passes, in the non-belt gripping position of the retention device the overlapping openings are in substantial alignment, in the position gripping the belt the openings are slightly out of alignment to trip the belt between co-acting edges of the openings.

11. The seat belt system of claim 10, wherein said retention device securely cinches the belt when actuated.

12. The seat bell restraint system of claim 10 wherein the seat belt comprises a diagonally extending shoulder belt.

13. The seat belt restraint system of claim 10 wherein said puller has a transverse passage and said cincher comprises front and rear walls and is secured to said puller by a plurality of spaced apart pins that extend through holes in said front and rear walls of said cincher and through said transverse passage in said puller.

14. The seat belt restraint system of claim 13 wherein said puller is disposed inside a back of the vehicle seat and located adjacent an outer shoulder of the seated person.

15. The seat belt restraint system of claim 14, wherein said puller comprises a piston and cylinder arrangement.

16. The seat belt restraint system of claim 10 wherein said turning loop comprises a D-shaped turning loop.

* * * * *